US012507692B2

(12) United States Patent
Torai et al.

(10) Patent No.: US 12,507,692 B2
(45) Date of Patent: Dec. 30, 2025

(54) ORGAN CONTAINER

(71) Applicant: SCREEN HOLDINGS CO., LTD., Kyoto (JP)

(72) Inventors: Shinji Torai, Kyoto (JP); Syuhei Yoshimoto, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 1149 days.

(21) Appl. No.: 17/469,149

(22) Filed: Sep. 8, 2021

(65) Prior Publication Data

US 2022/0079142 A1 Mar. 17, 2022

(30) Foreign Application Priority Data

Sep. 17, 2020 (JP) ................................ 2020-156015

(51) Int. Cl.
*A01N 1/162* (2025.01)

(52) U.S. Cl.
CPC .................................... *A01N 1/162* (2025.01)

(58) Field of Classification Search
CPC .................................. A01N 1/162; C12N 5/56
See application file for complete search history.

(56) References Cited

U.S. PATENT DOCUMENTS

2001/0022865 A1 9/2001 Meyer et al.
2017/0164606 A1 6/2017 Suzuki et al.
2020/0308520 A1 10/2020 Torai et al.
2021/0106002 A1 4/2021 Torai et al.
2021/0251217 A1 8/2021 Torai et al.
2021/0315202 A1 10/2021 Torai et al.

FOREIGN PATENT DOCUMENTS

CN 86203016 U 12/1986
CN 101289122 A 10/2008
CN 107969419 A 5/2018
CN 208338763 A 1/2019
CN 111315215 A 6/2020
(Continued)

OTHER PUBLICATIONS

Machine English Translation of CN111315215—Torai et al. (Year: 2020).*
(Continued)

*Primary Examiner* — Elizabeth A Robinson
*Assistant Examiner* — Jonathan E Lepage
(74) *Attorney, Agent, or Firm* — Rimon P.C.

(57) ABSTRACT

An organ container includes a bag-shaped or tube-shaped insulating sheet. The insulating sheet has an opening and is capable of containing an organ inserted in an inner space through the opening. The insulating sheet is formed of an extra flexible material. The insulating sheet has a hardness less than or equal to F45 according to a durometer hardness test compliant with JIS K 6253-3:2012. Accordingly, in the transplantation of an organ with a variety of sizes and shapes into a recipient, the organ container is capable of covering the surface of the organ along the surface of the organ while holding the organ. The organ container suppresses a further outward spread of the organ, thereby ensuring the field of operation and reducing the possibility of interfering with the work of a surgeon.

6 Claims, 10 Drawing Sheets

(56) References Cited

FOREIGN PATENT DOCUMENTS

| | | | | | |
|---|---|---|---|---|---|
| CN | 112471133 | A | | 3/2021 | |
| CN | 113261554 | A | | 8/2021 | |
| CN | 113519500 | A | | 10/2021 | |
| EP | 3 791 720 | A1 | | 3/2021 | |
| EP | 3 895 534 | A1 | | 10/2021 | |
| JP | 2013-005890 | A | | 1/2013 | |
| JP | 2014-144793 | A | | 8/2014 | |
| JP | 2019-094315 | A | | 6/2019 | |
| JP | 2020-044287 | A | | 3/2020 | |
| WO | WO-02089571 | A1 | * | 11/2002 | ............... A01N 1/02 |
| WO | WO-2016079324 | A1 | * | 5/2016 | ............. C08G 77/12 |
| WO | 2019/143887 | A1 | | 7/2019 | |
| WO | 2020/059413 | A1 | | 3/2020 | |

OTHER PUBLICATIONS

Chen et al, "Oil bleed from elastomeric thermal silicone conductive pads", 2016, Front. Chem. Sci. Eng., 10(4): 509-516 (Year: 2016).*

T. Shinji et al., "Reduction of Warm Ischemia Using a Thermal Barrier Bag in Kidney Transplantation: Study in a Pig Model", Transplantation Proceedings, vol. 51, No. 5, pp. 1442-1450 (2019).

Extended European Search Report issued in corresponding European Patent Application No. 21191018.7-1126, dated Feb. 1, 2022.

Chinese Office Action issued in corresponding Chinese Patent Application No. 202111090029.X dated Jun. 15, 2022, with English translation.

* cited by examiner

ORGAN CONTAINER

RELATED APPLICATIONS

This application claims the benefit of Japanese Application No. 2020-156015, filed on Sep. 17, 2020, the disclosure of which is incorporated by reference herein.

BACKGROUND OF THE INVENTION

Field of the Invention

The present invention relates to an organ container for containing an organ.

Description of the Background Art

In organ transplant operations, an organ removed from a donor is preserved under cooled conditions. This is because, if the organ is left at ordinary temperature and the bloodstream to the organ is stopped, i.e., the organ has got into a so-called warm ischemic state, the organ becomes easy to deteriorate due to metabolism in the organ, and the risk of occurrence of postoperative disorders will increase. Specifically, the temperature of the organ is kept low through procedures such as pouring a low-temperature preservation solution into the isolated organ or directly spraying ice-slush saline around the organ. This suppresses organ metabolism.

However, in the transplantation of an organ into a recipient, the organ is placed in the body cavity of the recipient and undergoes procedures such as vascular anastomosis. At this time, the organ cannot be kept under cooled conditions, so that the temperature of the organ rises due to the body temperature of the recipient or the outside air temperature and the organ gradually gets into a warm ischemic state. Hence, a surgeon carrying out the transplant operation has to maintain low-temperature conditions of the organ to be transplanted by, for example, performing procedures such as vascular anastomosis within a time as short as possible or pouring ice or other materials into the abdominal cavity. In the latter case, not only the organ but also the fingertips of the surgeon will be cooled at the same time, and this is disadvantageous for vascular anastomosis that requires high precision.

In view of this, the inventors of the present application have proposed a technique disclosed in Japanese Patent Application Laid-Open No. 2020-044287 in which, in the transplantation of an organ into a recipient, a bag-shaped organ accommodation pouch formed of an insulating sheet is used to hold the organ in the body cavity so as to suppress a temperature rise in the organ. The organ accommodation pouch described in Japanese Patent Application Laid-Open No. 2020-044287 has an opening through which the organ can pass, the opening having a ring-shaped insertion hole that is provided along the edge of the opening and through which a drawstring is threaded. The opening of the organ accommodation pouch shrinks when the drawstring is pulled. A surgeon inserts an organ into the inside of the insulating sheet through the opening and then pulls the drawstring to close the opening.

However, the organ accommodation pouch according to Japanese Patent Application Laid-Open No. 2020-044287 requires the sizes and shapes of the insulating sheet and the opening to be set in accordance with the size and shape of an organ to be contained. Hence, it is necessary to prepare a plurality of organ accommodation pouches of different sizes and shapes in order to respond to various organs to be transplanted, and this may result in a cost increase. If an organ accommodation pouch that does not fit the size and shape of an organ to be transplanted is used, for example, the organ accommodation pouch may be too small to completely cover the organ. As another example, a too large organ accommodation pouch may spread largely outward of an organ, consequently narrowing the field of operation or interfering with the work of a surgeon.

SUMMARY OF THE INVENTION

It is an object of the present invention to provide a medical appliance that is capable of holding an organ with a variety of sizes and shapes and hardly interferes with the work of a surgeon in the transplantation of the organ into a recipient.

To solve the problems described above, a first aspect of the present application is an organ container for containing an organ. The organ container includes a bag-shaped or tube-shaped insulating sheet having an opening and capable of containing an organ inserted into an inner space through the opening. The insulating sheet is formed of an extra flexible material. The insulating sheet has a hardness less than or equal to F45 according to a durometer hardness test compliant with JIS K 6253-3:2012.

According to the first aspect of the present application, it is possible, by using the organ container including the insulating sheet formed of an extra flexible material, to cover the surface of an organ with a variety of sizes and shapes along the surface of the organ while holding the organ. This suppresses a temperature rise in the organ due to the body temperature of a recipient or the outside air temperature and reduces the occurrence of disorders. It is also possible to reduce damage to the organ even if some sort of impact is applied to the organ. Besides, there is no need to prepare a plurality of organ containers of different sizes and shapes in accordance with the size and shape of an organ to be contained, and this leads to a cost reduction. Moreover, the organ container suppresses a further outward spread of the organ, thereby ensuring the field of operation and reducing the possibility of interfering with the work of a surgeon.

DESCRIPTION OF THE PREFERRED EMBODIMENTS

Embodiments of the present invention will be described hereinafter with reference to the drawings. In the following description, the up-down direction and the back-and-forth direction of an organ container are defined as illustrated in FIGS. 1 to 3 and FIGS. 7 to 10, which will be described later. It is, however, noted that this definition of the up-down direction and the back-and-forth direction does not intend to limit the orientation of the organ container during use.

In the present application, "donors" and "recipients" may be humans, or may be non-human animals. That is, "organs" according to the present application may be human organs, or may be organs of non-human animals. The non-human animals may be rodents such as mice and rats, ungulates such as pigs, goats, and sheep, non-human primates such as chimpanzees, or other non-human mammals, or may be nonmammalian animals.

1. First Embodiment

1-1. Organ Container

Figure 1:
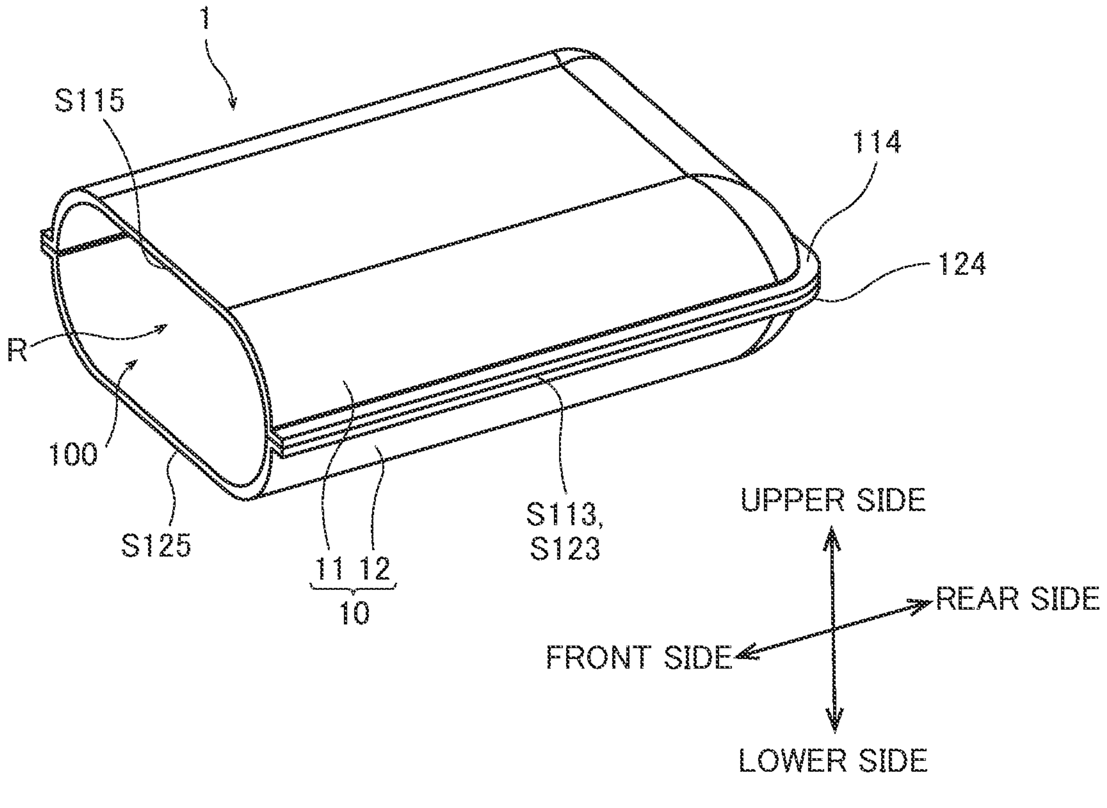
FIG. 1 is a perspective view of an organ container according to a first embodiment.
Figure 2:
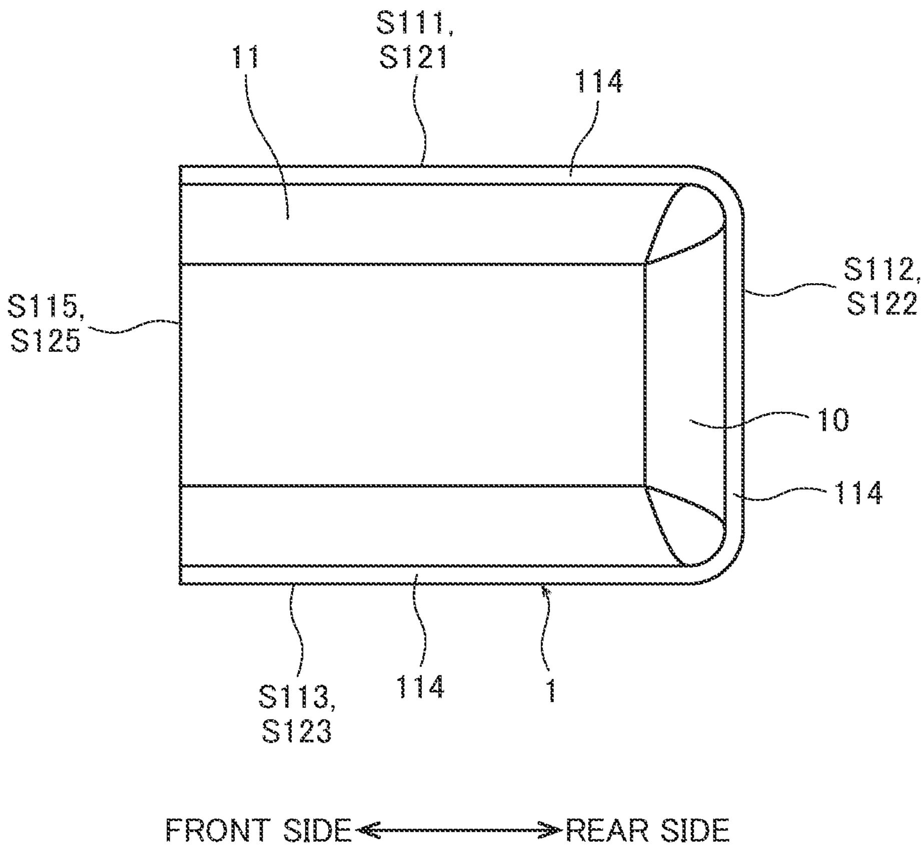
FIG. 2 is a top view of the organ container according to the first embodiment.
Figure 3:
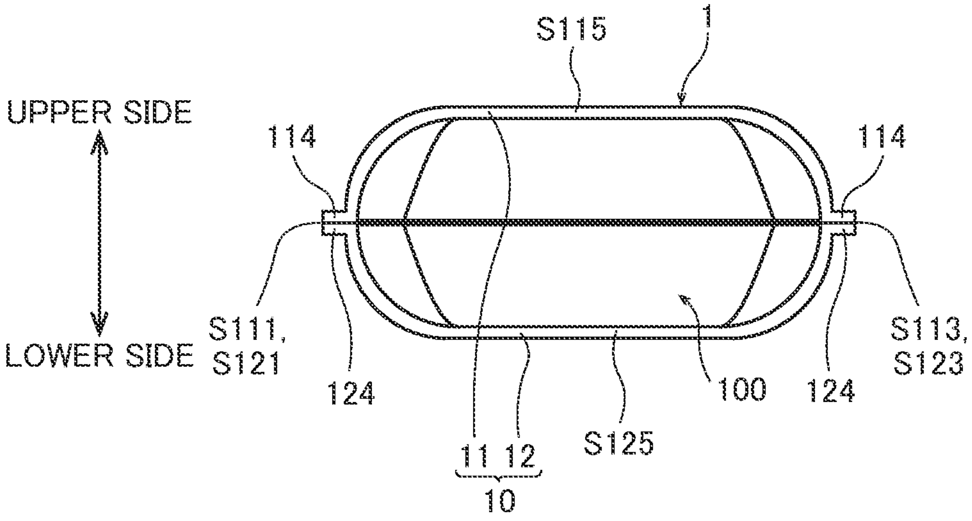
FIG. 3 is a side view of the organ container according to the first embodiment.

FIG. 1 is a perspective view of an organ container 1 according to a first embodiment. FIG. 2 is a top view of the organ container 1. FIG. 3 is a side view of the organ container 1 when viewed from the front side. The "front side" as used herein refers to the side of an opening 100, which will be described later. The organ container 1 is a container for temporarily containing an organ that is to be transplanted and its surrounding organs in a transplant operation of transplanting an organ removed from a donor into a recipient 9. That is, the organ container 1 is a medical appliance for use in organ transplant operations.

The organ container 1 is capable of containing any of various organs 90 including a liver, a kidney, a large intestine, a small intestine, a pancreas, a spleen, and a lung. In the present embodiment, it is assumed that the organ container 1 contains a liver as an organ 90 to be transplanted. The organ container 1 is also used to contain organs located around the organ 90 to be transplanted. In the following description, such organs located around the organ 90 are referred to as "organs 90*d*" for the sake of convenience. An organ container 1 that contains the organs 90*d* around the organ 90 is referred to as an "organ container 1*d*" for the sake of convenience. It is, however, noted that the organ containers 1 and 1*d* are containers having the same structure including size and shape.

Figure 4:
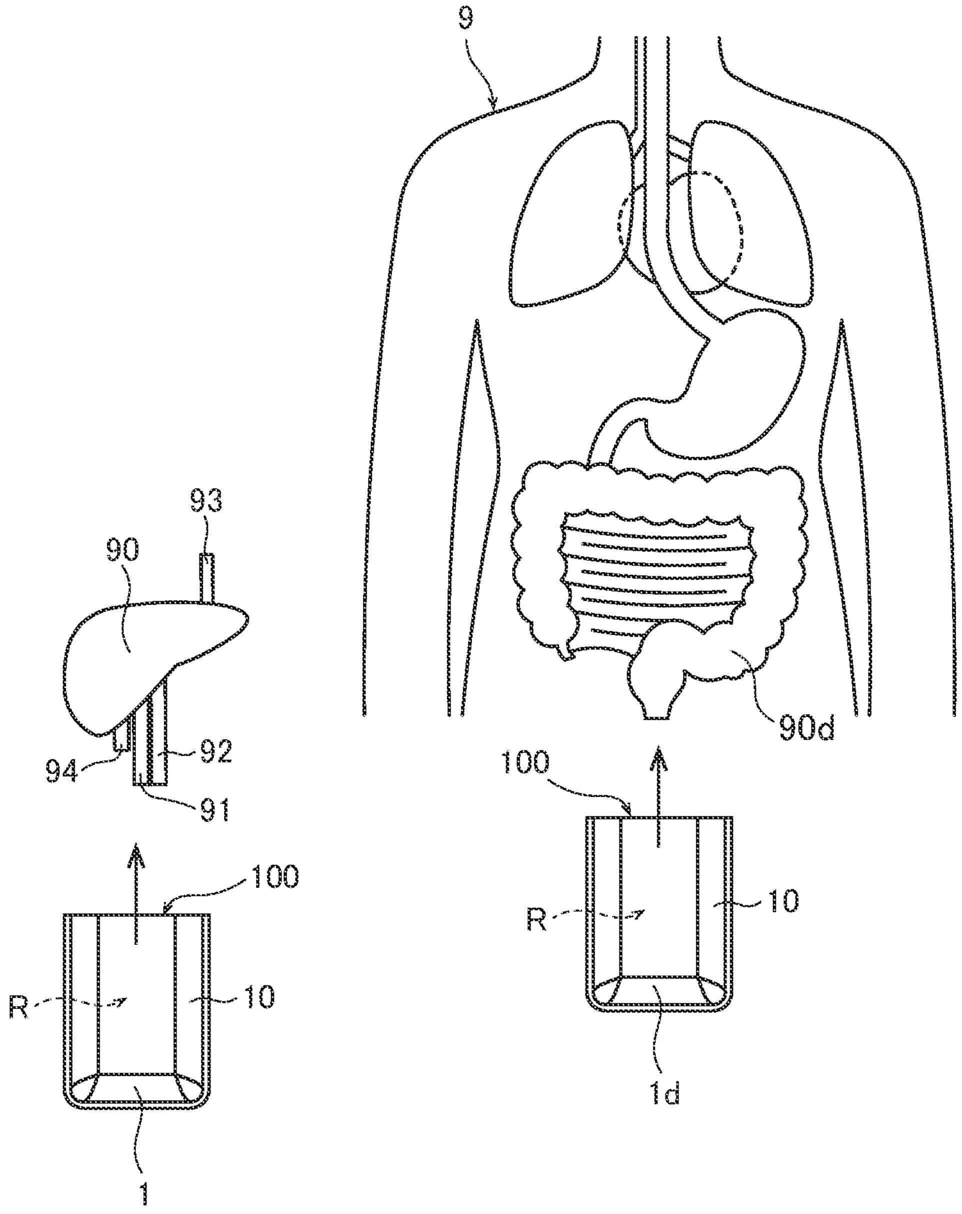
FIG. 4 is a schematic illustration immediately before organ containers contain organs.
Figure 5:
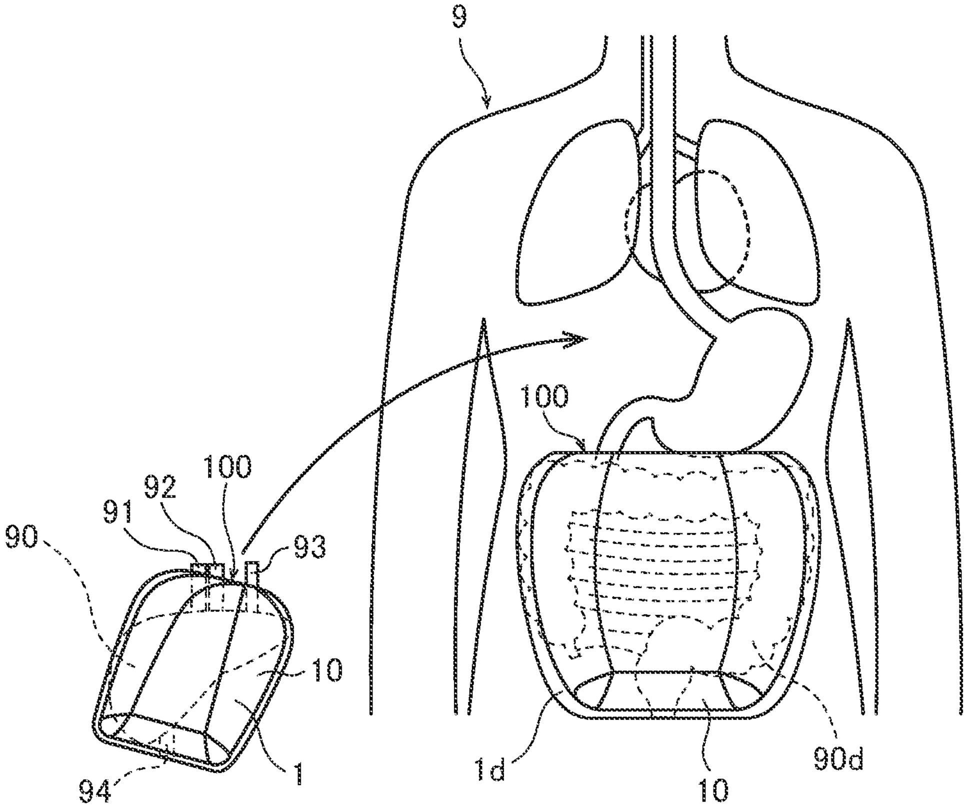
FIG. 5 is a schematic illustration immediately after the organ containers have contained the organs.

In the present embodiment, the organ container 1*d* contains a large intestine and a small intestine as organs 90*d* located around the organ 90 to be transplanted. FIG. 4 is a schematic illustration immediately before the organ containers 1 and 1*d* contain the organ 90 to be transplanted and the surrounding organs 90*d*. FIG. 5 is a schematic illustration immediately after the organ containers 1 and 1*d* have contained the organ 90 to be transplanted and the surrounding organs 90*d*.

As illustrated in FIGS. 1 to 3, the organ container 1 includes an insulating sheet 10. The insulating sheet 10 includes an upper sheet 11 and a lower sheet 12. In the present embodiment, the upper sheet 11 and the lower sheet 12 each have a generally rectangular shape (generally oblong shape) in plan view (in top view). The upper sheet 11 has a curved surface that is curved downward toward three sides S111, S112, and S113 of the rectangular shape in plan view. The lower sheet 12 has a curved surface that is curved upward toward three sides S121, S122, and S123 of the rectangular shape in plan view. The upper sheet 11 and the lower sheet 12 have approximately the same shape in plan view and overlap each other in the up-down direction.

The three sides S111, S112, and S113 of the upper sheet 11 each have a gusset 114. The three sides S121, S122, and S123 of the lower sheet 12 each have a gusset 124. The side S111 of the upper sheet 11 and the side S121 of the lower sheet 12 are fixedly attached to each other by thermal deposition at the gussets 114 and 124 that overlap each other in the up-down direction. The side S112 of the upper sheet 11 and the side S122 of the lower sheet 12 are fixedly attached to each other by thermal deposition at the gussets 114 and 124 that overlap each other in the up-down direction. The side S113 of the upper sheet 11 and the side S123 of the lower sheet 12 are fixedly attached to each other by thermal deposition at the gussets 114 and 124 that overlap each other in the up-down direction.

Alternatively, the upper sheet 11 and the lower sheet 12 may be fixedly attached to each other with suture or by bonding at the gussets 114 and 124 overlapping each other in the up-down direction. The organ container 1 does not necessarily have to include the gussets 114 and 124, and may be configured of a single seamless insulating sheet 10.

On the other hand, the remaining side S115 of the rectangular shape of the upper sheet 11 in plan view and the remaining side S125 of the rectangular shape of the lower sheet 12 in plan view are spaced from each other in the up-down direction. This forms an opening 100 of the insulating sheet 10. In the present embodiment, the opening 100 has an elliptical shape. The opening 100 provides communication between an inner space R of the insulating sheet 10 and an outer space.

The insulating sheet 10 with the above-described configuration has a bag-like shape and is capable of stably containing the organ 90 or the organs 90*d* inserted into the inner space R of the insulating sheet 10 through the opening 100. The opening 100 serves as an input-output port for inserting the organ 90 or the organs 90*d* into the inner space R. When the organ 90 or the organs 90*d* are contained in the inner space R of the insulating sheet 10, the opening 100 also functions as a connection port for connecting blood vessels or the like that extend from the organ 90 or the organs 90*d* to the outside. In the present embodiment, the size of the inner space R of the insulating sheet 10 at no load is smaller than the size(s) of the outside diameter(s) of the organ 90 or the organs 90*d*.

The insulating sheet 10 is formed of a styrene-based elastomer that is an extra flexible material having insulating properties. Specifically, the insulating sheet 10 is formed of a thermoplastic oil-bleeding elastomer. Alternatively, the insulating sheet 10 may be formed of an urethane elastomer or an oil-bleeding silicone gel. The insulating sheet 10 according to the present embodiment has a hardness less than or equal to F45 according to a durometer hardness test compliant with Japanese Industrial Standards (JIS) K 6253-3:2012. The insulating sheet 10 has a tensile stress less than or equal to 5.8 $N/m^2$ at an elongation rate of 200%.

The use of the extra flexible material for the insulating sheet 10 allows considerably easy extension of the insulating sheet 10 including the opening 100 without causing plastic deformation or rupture. As illustrated in FIGS. 4 and 5, with the extension of the openings 100 and the inner spaces R, the organs 90 (liver) and 90*d* (large and small intestines) with greater outer diameters than the openings 100 and the inner spaces R at no load can be contained in the inner spaces R through the openings 100. The insulating sheets 10 become deformed flexibly along the surfaces of the organs 90 and 90*d* while holding the organs 90 and 90*d* in the inner spaces R, and are thus capable of covering most of the surfaces of the organs 90 and 90*d*. At this time, the insulating sheets 10 are slightly pressed over the surfaces of the organs 90 and 90*d* by an elastic force. This, as a result, reduces the possibility that the organs 90 and 90*d* will be slipped off or detached from the insulating sheets 10.

Accordingly, it is possible to reduce the transmission of an external temperature outside the insulating sheet 10 or the transmission of heat generated from various equipment used in the transplant operation to the organ 90 to be transplanted, which is held in the inner space R. The external temperature as used herein refers to, for example, the body temperature of the recipient 9 or the outside air temperature. As a result, a temperature rise in the organ 90 is suppressed, and procedures such as vascular anastomosis can be performed while the temperature of the organ 90 is kept low. This reduces the possibility of the organ 90 getting into a warm ischemia state and reduces the occurrence of postoperative disorders.

As will be described in detail later, in the case where procedures such as vascular anastomosis are performed while the organ container 1 containing the organ 90 is placed in the body cavity of the recipient 9, a low-temperature preservation solution is infused into the interstices between the inner surface of the insulating sheet 10 and the organ 90 with a syringe or a pipette. At this time, the insulating sheet 10 around the opening 100 is brought into intimate contact with the surface of the organ 90 without clearance by an elastic force. Thus, the preservation solution is securely held in the inner space R without flowing out through the opening 100. This further suppresses a temperature rise in the organ 90 and further reduces the possibility of the organ 90 getting into a warm ischemia state. Moreover, since the frictional force between the organ 90 and the inner surface of the insulating sheet 10 decreases due to the preservation solution or moisture contained in the organ 90. Accordingly, the insulating sheet 10 fits more smoothly to the surface of the organ 90.

In the present embodiment, the insulating sheet 10 is transparent and allows the organ 90 held in the inner space R of the organ container 1 to be visually recognizable from the outer space. Thus, the surgeon can conduct work while checking the condition of the organ 90 held in the inner space R of the organ container 1 from the outer space. This allows the surgeon to immediately grasp and cope with the occurrence of some sort of abnormalities that can cause diseases such as congestion or necrosis and to thereby reduce the risk of occurrence of such diseases. However, the insulating sheet 10 does not necessarily have to be transparent in its entirety, and at least part of the insulating sheet 10 may be transparent.

As illustrated in FIGS. 4 and 5, if the separately prepared organ container 1*d* is used to contain the surrounding organs 90*d*, the surrounding organs 90*d* can be collected together at a position farther away from the position of the organ 90 to be transplanted. This ensures the field of operation and reduces the possibility that the surrounding organs 90*d* may interfere with the work of a surgeon. Besides, the frictional force between the organs 90*d* and the inner surface of the insulating sheet 10 in the organ container 1*d* decreases due to moisture contained in the organs 90*d*. Accordingly, the insulating sheet 10 fits more smoothly to the surfaces of the organs 90*d*.

The use of the above-described material for the insulating sheet 10 allows the outer surface of the insulating sheet 10 to have tackiness (adhesion properties). Accordingly, adhesive force acts between the outer surface of the insulating sheet 10 of the organ container 1 or 1*d* and its surrounding inner surface of the body cavity or the like of the recipient 9. As a result, the organ containers 1 and 1*d* containing the organs 90 and 90*d* can be arranged more stably within the body cavity of the recipient 9.

Since the insulating sheets 10 become deformed along the surfaces of the organs 90 and 90*d* held in the inner spaces R, the insulating sheets 10 can suppress larger outward spread of the organs 90 and 90*d*. Accordingly, it is possible to ensure the field of operation and to reduce the possibility of the insulating sheets 10 interfering with the work of a surgeon.

The use of the extra flexible material for the insulating sheets 10 also allows the insulating sheets 10 to reduce some sort of impact that may be applied to the organs 90 and 90*d* held in the inner spaces R and to reduce the occurrence of damage to the organs 90 and 90*d*. Moreover, since the insulating sheets 10 have only a slight tensile stress during extension, it is possible to considerably reduce loads that may be applied to the organs 90 and 90*d* held in the inner spaces R due to the extension of the organ containers 1 and 1*d*. This considerably reduces stresses on the organs 90 and 90*d* and further reduces damage or deterioration of the organs 90 and 90*d*.

As described above, in the present embodiment, the plurality of organ containers 1 and 1*d* having the same structure including size and shape are used to hold the organs 90 and 90*d* with a variety of sizes and shapes and to cover the surfaces of the organs 90 and 90*d* along the surfaces of the organs 90 and 90*d*. This eliminates the need to prepare a plurality of organ containers of different sizes and shapes in order to respond to each organ 90 or 90*d* to be contained, and accordingly leads to a cost reduction.

1-2. Organ Transplantation Procedure

Figure 6:
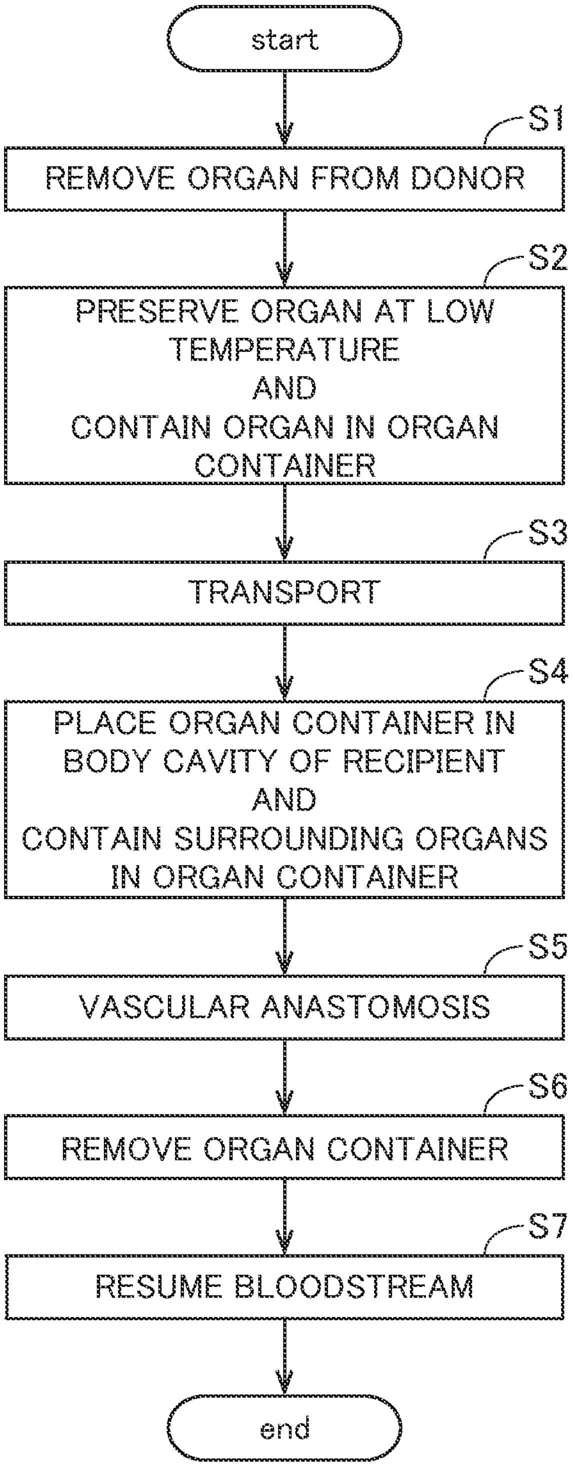
FIG. 6 is a flowchart of a transplant operation procedure using the organ container.

Next is a description of a transplant operation procedure for transplanting an organ 90 removed from a donor into a recipient 9, using the organ container 1 described above. FIG. 6 is a flowchart of the transplant operation procedure using the organ container 1. In the present embodiment, the organ 90 is a liver.

In a transplant operation, first, the organ 90 is removed from the donor (step S1). Specifically, a plurality of blood vessels that extend from the organ 90 of the donor and that include a portal vein 91, a hepatic artery 92, and a hepatic vein 93, and a bile duct 94 (see FIG. 4) are sectioned to remove the organ 90 from the body cavity of the donor.

The removed organ 90 is preserved while being immersed in a low-temperature preservation solution. The organ 90 is also contained in the organ container 1 (step S2). The preservation solution may, for example, be saline maintained at 4° C. In general, if the organ is left at ordinary temperature and the bloodstream to the organ is stopped, i.e., the organ has got into a so-called warm ischemic state, the organ becomes easy to deteriorate due to metabolism in the organ. In view of this, in step S2, the organ 90 is preserved at a temperature lower than ordinary temperature so as to suppress deterioration of the organ 90.

Alternatively, in step S2, the portal vein 91, the hepatic artery 92, and the hepatic vein 93 of the organ 90 may be connected to tubes, and the organ 90 may be preserved while being perfused with a preservation solution. As another alternative, in step S2, only one of the portal vein 91 and the hepatic artery 92 may be connected to a tube. The perfusion with the preservation solution may be continued until step S4, which will be described below.

The timing when the organ 90 is contained in the organ container 1 may be before the organ 90 is immersed in the preservation solution, or may be after the organ 90 is immersed in the preservation solution for a whole and cooled enough. When the organ 90 is contained in the organ container 1, the organ 90 is inserted through the opening 100 of the organ container 1 into the inner space R of the bag-shaped insulating sheet 10. In this way, the organ 90 is held in the insulating sheet 10. At this time, the insulating sheet 10 is slightly pressed over the surface of the organ 90 by the elastic force. This reduces the possibility that the organ 90 may be slipped off or detached from the insulating sheet 10. Note that the portal vein 91, the hepatic artery 92, and the hepatic vein 93 of the organ 90 that are anastomosed to the blood vessels of the recipient 9 in step S5, which will be described later, are exposed to the outside through the opening 100.

Moreover, a low-temperature preservation solution is infused into the interstices between the organ 90 and the inner surface of the insulating sheet 10 with a syringe or a pipette. At this time, the insulating sheet 10 around the opening 100 is brought into intimate contact with the surface of the organ 90 without clearance by an elastic force. Thus, the preservation solution is securely held in the inner space R without flowing out through the opening 100. The organ 90 is further immersed again in a low-temperature preservation solution and kept in a low-temperature preservation condition while being enclosed by the organ container 1.

The organ 90 held in the organ container 1 is transported from the donor to the recipient 9 while being immersed in the low-temperature preservation solution (step S3). The organ 90 transported to the recipient 9 is immersed in a low-temperature preservation solution while continuing to be held in the organ container 1 until immediately before the transplantation. As described above, the organ container 1 is formed of an extra flexible material having elasticity. Thus, the organ container 1 can absorb impact that may be applied to the organ 90 during transport or operation. Accordingly, it is possible to reduce damage to the organ 90.

Then, the abdominal region of the recipient 9 is opened, and the organ container 1 containing the organ 90 is placed in the body cavity of the recipient 9 (step S4). Here, the outer surface of the insulating sheet 10 has tackiness (adhesion properties). Accordingly, adhesive force acts between the outer surface of the insulating sheet 10 and its surrounding inner surface of the body cavity or the like of the recipient 9. As a result, the organ container 1 containing the organ 90 can be arranged more stably within the body cavity of the recipient 9.

The separately prepared organ container 1*d* is used to contain organs 90*d* located adjacent to the vicinity of the position of the organ 90 to be transplanted and to collect these organs 90*d* at a position farther away from the position of the organ 90. In the present embodiment, the organs 90*d* are large and small intestines. Accordingly, it is possible to ensure the field of operation in the body cavity and to reduce the possibility of the surrounding organs 90*d* interfering with the work of a surgeon. Then, the blood vessels of the recipient 9 are anastomosed to the portal vein 91, the hepatic artery 92, and the hepatic vein 93 of the organ 90 that are exposed to the outside through the opening 100 of the organ container 1 (step S5).

Note that the insulating sheet 10 is transparent and allows the organ 90 held in the inner space R of the organ container 1 to be visually recognizable from the outer space. This allows the surgeon to perform vascular anastomose while checking the condition of the organ 90 held in the inner space R of the organ container 1 from the outer space. Accordingly, even if some sort of abnormalities that can cause diseases such as congestion or necrosis may occur, the surgeon is able to immediately grasp and cope with such abnormalities. This reduces the risk of occurrence of such diseases.

During the work in steps S2 to S5, blood does not flow inside the organ 90. During the work in steps S4 and S5, the organ 90 contained in the organ container 1 is placed in the body cavity of the recipient 9. However, since the organ 90 is contained in the organ container 1 and has most of its surface covered with the insulating sheet 10, the organ 90 is less susceptible to the influence of the external temperature or the heat generated from various equipment used in the transplant operation. The external temperature as used herein refers to, for example, the body temperature of the recipient 9 or the outside air temperature. Thus, vascular anastomosis can be performed while suppressing a temperature rise in the organ 90. Accordingly, it is possible to reduce the possibility that the organ 90 will get in a warm ischemia state and deteriorates due to metabolism. As a result, the occurrence of postoperative disorders is reduced.

In steps S4 and S5, the low-temperature preservation solution is infused into the inside of the organ container 1 at regular time intervals with a syringe or a pipette. For example, the low-temperature preservation solution is infused every several minutes into the inside of the organ container 1. A preservation solution that already exists inside the organ container 1 is collected in a drain and discharged to the outside of the body of the recipient 9. Here, the preservation solution that exists inside the organ container 1 refers to a slightly warmed preservation solution. This further suppresses a temperature rise in the organ 90 in the insulating sheet 10.

Since the organs 90 and 90*d* are each contained in the insulating sheet 10 formed of an extra flexible material having elasticity, even if some sort of impact is applied on the organs during the operation, the insulating sheets 10 can absorb the impact and thereby reduce damage to the organs 90 and 90*d*. The insulating sheets 10 have a bag-like shape and cover the organs 90 and 90*d* while becoming deformed along the surfaces of the organs 90 and 90*d*. Thus, the insulating sheets 10 suppress large outward spread of the organs 90 and 90*d*. This reduces the possibility that the ends of the insulating sheets 10 interfere with the work of a surgeon during the operation.

Thereafter, the organ 90 that has undergone vascular anastomosis is taken out through the opening 100 of the organ container 1. Then, the organ container 1 is removed from the body cavity of the recipient 9 (step S6). Thereafter, the bloodstream from the organ 90 to the anastomosed blood vessels of the recipient 9 is resumed (step S7). The organs 90*d* are also taken out through the opening 100 of the organ container 1*d*, and the organ container 1*d* is removed from the body cavity of the recipient 9.

2. Second Embodiment

Next, a second embodiment of the present invention will be described. The following description focuses on differences from the first embodiment described above, and redundant descriptions of similar points to those described in the first embodiment shall be omitted.

Figure 7:
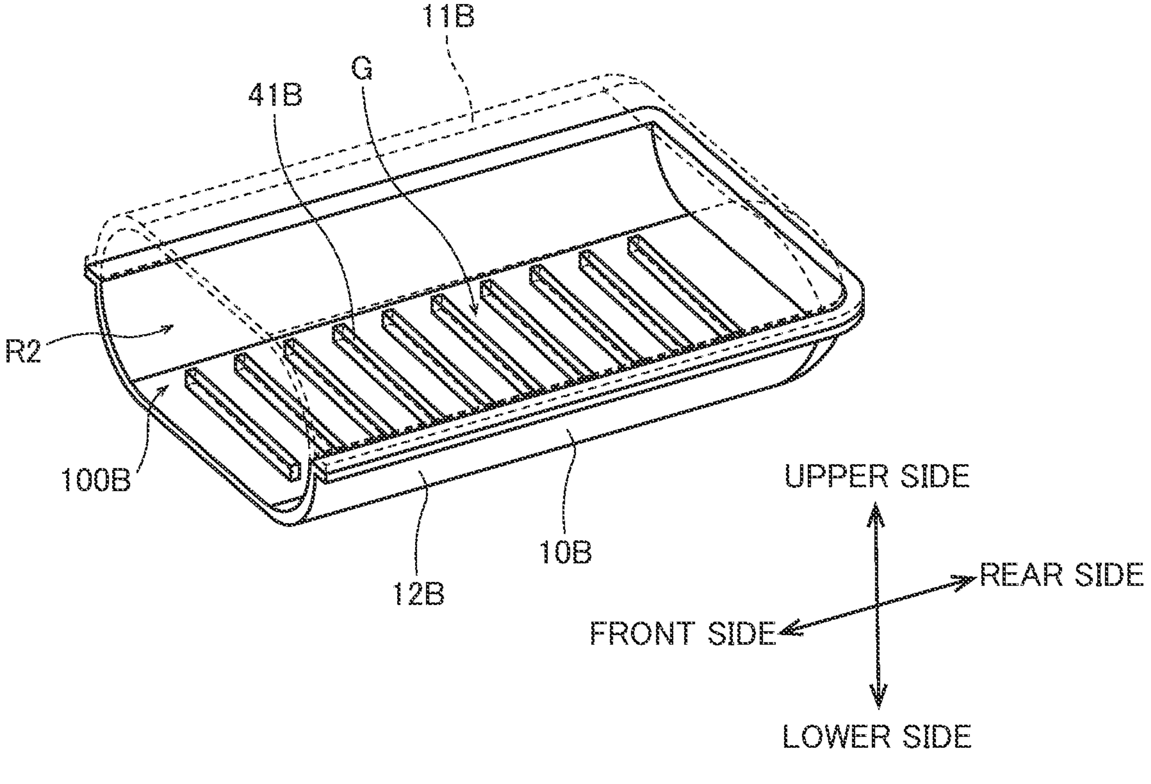
FIG. 7 is a perspective view of a lower sheet according to a second embodiment.
Figure 8:
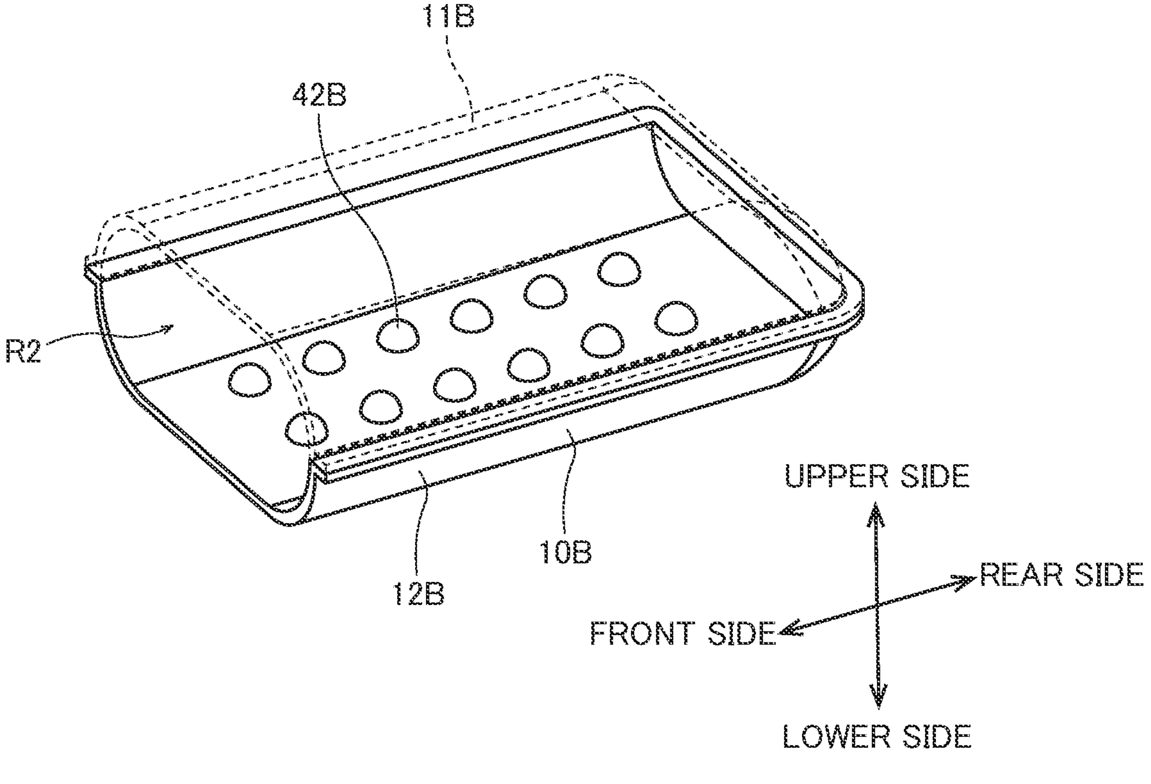
FIG. 8 is a perspective view of a lower sheet according to a variation.
Figure 9:
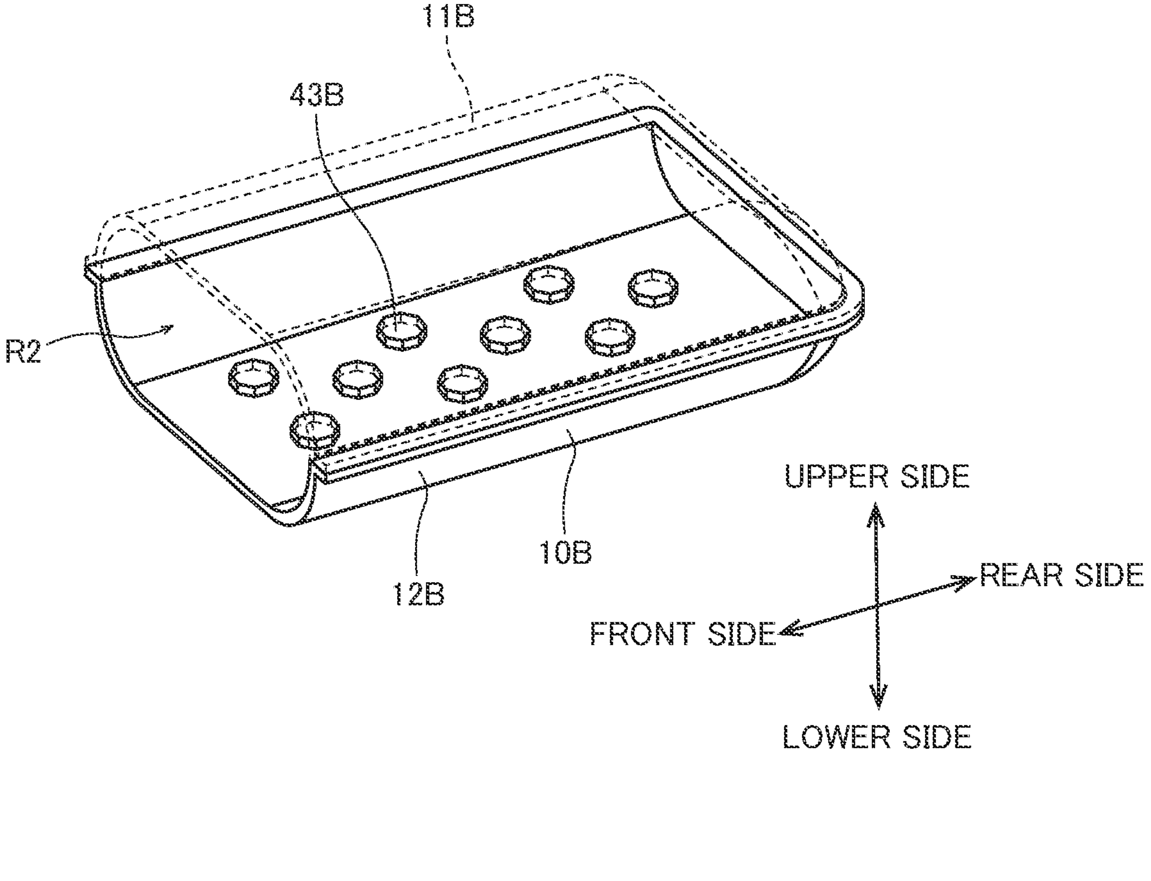
FIG. 9 is a perspective view of a lower sheet according to another variation.

FIG. 7 is a perspective view of a lower sheet 12B of an insulating sheet 10B according to the second embodiment. In FIG. 7 and FIGS. 8 and 9, which will be described later, an upper sheet 11B of the insulating sheet 10B is illustrated with dashed lines. The lower sheet 12B according to the present embodiment has an upper surface with irregularities. The irregularities include a plurality of linear projections 41B. Each linear projection 41B projects from the upper surface of the lower sheet 12B toward an inner space R2 of the insulating sheet 10B. The linear projections 41B extend approximately parallel to the edge of an opening 100B.

In the present embodiment, the insulating sheet 10B with the above-described configuration, i.e., the irregularities of the insulating sheet 10B, further reduce the possibility that, in the transplantation of the organ 90 into the recipient 9, the organ 90 contained in the inner space R2 of the insulating sheet 10B will be slipped off or detached from the insulating sheet 10B. As a result, vascular anastomosis can be performed with the organ 90 stably held in the inner space R2 and with the temperature of the organ 90 kept low. Accordingly, it is possible to further reduce the possibility of the organ 90 getting into a warm ischemia state and to further suppress the occurrence of postoperative disorders.

In the present embodiment, the insulating sheet 10B with the above-described configuration includes a plurality of grooves G formed in the interstices between the organ 90 and the inner surface of the insulating sheet 10B when the organ 90 is contained in the inner space R2 of insulating sheet 10B. Each of the grooves G extends approximately parallel to the edge of the opening 100B. When a low-temperature preservation solution is infused into the inside of the organ container 1B, each of the grooves G can securely hold the preservation solution therein. This further suppresses a temperature rise in the organ 90.

Note that the linear projections 41B may be provided in the lower surface of the upper sheet 11B. Each of the linear projections 41B may extend approximately perpendicular to the edge of the opening 100B, or may extend in a direction inclined to the edge of the opening 100B. As another alternative, each of the linear projections 41B may have a taper surface at each corner. As yet another alternative, the linear projections 41B may be provided at equal intervals, or may be provided at irregular intervals.

The irregularities of the insulating sheet 10B are not limited thereto. For example, the upper surface of the lower sheet 12B or the lower surface of the upper sheet 11B may have a plurality of hemispheric projections 42B as in a variation illustrated in FIG. 8. Each of the hemispheric projections 42B may project toward the inner space R2 of the insulating sheet 10B. As another alternative, the upper surface of the lower sheet 12B or the lower surface of the upper sheet 11B may have a plurality of octagonal columnar projections 43B as in another variation illustrated in FIG. 9. Each of the octagonal columnar projections 43B may project toward the inner space R2 of the insulating sheet 10B. Moreover, the irregularities may be provided in bands, or may be provided in a lattice, or may be provided in any other pattern.

3. Third Embodiment

Next, a third embodiment of the present invention will be described. The following description focuses on differences from the first and second embodiments described above, and redundant descriptions of similar points to those described in the first and second embodiments shall be omitted.

Figure 10:
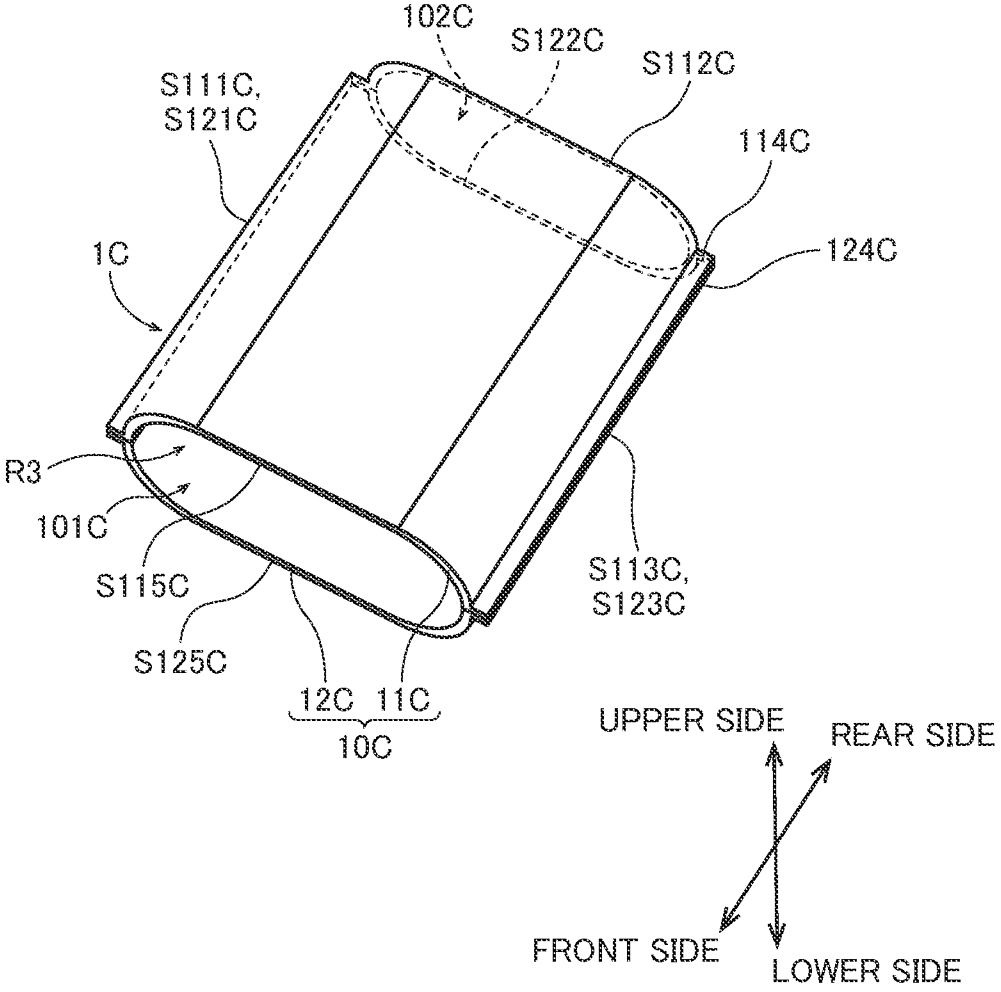
FIG. 10 is a perspective view of an organ container according to a third embodiment.

FIG. 10 is a perspective view of an organ container 1C according to a third embodiment. As illustrated in FIG. 10, the organ container 1C includes an insulating sheet 10C that includes an upper sheet 11C and a lower sheet 12C. The upper sheet 11C and the lower sheet 12C each have a generally rectangular shape (oblong shape) in plan view (in top view). The upper sheet 11C has a curved surface that is curved downward toward two sides S111C and S113C of the rectangular shape in plan view. The lower sheet 12 has a curved surface that is curved upward toward two sides S121C and S123C of the rectangular shape in plan view. The upper sheet 11C and the lower sheet 12C approximately have the same shape in plan view and overlap each other in the up-down direction.

The two sides S111C and S113C of the upper sheet 11C each have a gusset 114C. The two sides S121C and S123C of the lower sheet 12C each have a gusset 124C. The side S111C of the upper sheet 11C and the side S121C of the lower sheet 12C are fixedly attached to each other by thermal deposition at the gussets 114C and 124C that overlap each other in the up-down direction. The side S113C of the upper sheet 11C and the side S123C of the lower sheet 12C are fixedly attached to each other by thermal deposition at the gussets 114C and 124C that overlap each other in the up-down direction.

On the other hand, a remaining side S112C of the rectangular shape of the upper sheet 11C in plan view and a remaining side S122C of the rectangular shape of the lower sheet 12C in plan view are spaced from each other in the up-down direction. The remaining side S115C of the rectangular shape of the upper sheet 11C in plan view and the remaining side S125C of the rectangular shape of the lower sheet 12C in plan view are spaced from each other in the up-down direction. The sides S112C and S115C of the upper sheet 11C face each other. The sides S122C and S125C of the lower sheet 12C face each other. Accordingly, the insulating sheet 10C have two openings 101C and 102C facing each other. In the present embodiment, the two openings 101C and 102C each have an elliptical shape. The openings 101C and 102C each provide communication between the outer space and an inner space R3 of the insulating sheet 10C.

The insulating sheet 10C with the above-described configuration has a tubular shape. The insulating sheet 10C is capable of containing the organs 90 and 90*d* inserted into the inner space R3 of the insulating sheet 10C through the opening 101C or 102C. The openings 101C and 102C each serve as an input-output port for inserting the organs 90 and 90*d* into the inner space R3. Each of the openings 101C and 102C also functions as a connection port for connecting blood vessels or the like that extend from the organs 90 and 90*d* to the outside while the organs 90 and 90*d* are contained in inner space R3 of the insulating sheet 10C.

As described above, the insulating sheet 10C according to the present embodiment has the two openings 101C and 102C facing each other. Thus, even in the case where an organ to be contained such as a liver, a pancreas, or a spleen has blood vessels that extend in a plurality of directions and that are to be anastomosed during a transplant operation, each blood vessel can be exposed to the outer space through one of the two openings 101C and 102C without considerably changing the orientations of the blood vessels. Note that the openings 101C and 102C do not necessarily have to be of the same size.

4. Variations

While embodiments of the present invention have been described thus far, the present invention is not intended to be limited to the embodiments described above.

In the second embodiment described above, one insulating sheet has one type of irregularities on the inner surface. However, one insulating sheet may have a plurality of types of irregularities on the inner surface. For example, irregularities including a plurality of linear projections may be formed on the inner surface of an insulating sheet in the vicinity of the opening, and irregularities including a plurality of hemispheric projections may be formed on the inner surface of the insulating sheet at positions away from the opening. Moreover, an insulating sheet may have an inner surface with a plurality of types of irregularities regularly formed, or may have an inner surface with a plurality of types of irregularities irregularly formed.

In the embodiments described above, the insulating sheet of the organ container is formed of a single type of material, but the present invention is not limited thereto. The insulating sheet may be formed of a plurality of types of materials. For example, the upper sheet and the lower sheet may be formed of extra flexible materials each having a different hardness. As another alternative, a coating for preventing external wounds may be applied to the outer face of the insulating sheet. The upper sheet and the lower sheet each may have a quadrangular shape other than the rectangular shape.

A detailed structure of the organ container does not necessarily have to completely match the structure illustrated in each drawing according to the present application. Each constituent elements described in the above-described embodiments and variations may be combined approximately without causing no contradiction.

What is claimed is:

1. An organ container for containing an organ, comprising:

a bag-shaped or tube-shaped insulating sheet having a quadrangular shape in plan view and having an opening and capable of containing an organ inserted into an inner space through said opening, wherein said insulating sheet is formed of a flexible material, and said insulating sheet has a tensile stress less than or equal to 5.8 $N/m^2$ at an elongation rate of 200%.

2. The organ container according to claim 1, wherein said insulating sheet is formed of a styrene-based elastomer.

3. The organ container according to claim 1, wherein said insulating sheet is formed of an oil-bleeding elastomer.

4. The organ container according to claim 1, wherein said insulating sheet includes an upper sheet and a lower sheet, said upper sheet and said lower sheet each have a quadrangular shape in plan view and overlap each other in an up-down direction, the upper sheet and the lower sheet having approximately the same shape, and said upper sheet and said lower sheet are fixedly attached to each other at three sides of said quadrangular shape and are spaced from each other at a remaining one side to form said opening.

5. The organ container according to claim 1, wherein said insulating sheet includes an upper sheet and a lower sheet, said upper sheet and said lower sheet each have a quadrangular shape in plan view and overlap each other in an up-down direction, the upper sheet and the lower sheet having approximately the same shape, and said upper sheet and said lower sheet are fixedly attached to each other at two opposing sides of said quadrangular shape and are separated from each other at remaining two sides to form said opening.

6. The organ container according to claim 1, wherein at least part of said insulating sheet is transparent and allows an organ held in said inner space to be visually recognizable from an outer space.

* * * * *